United States Patent
Yamada et al.

(10) Patent No.: US 11,130,404 B2
(45) Date of Patent: Sep. 28, 2021

(54) HEAD-UP DISPLAY APPARATUS

(71) Applicant: KONICA MINOLTA, INC., Chiyoda-ku (JP)

(72) Inventors: Norihide Yamada, Chiyoda-ku (JP); Junji Hashimura, Hachioji (JP); Osamu Tannai, Fuchu (JP); Toshiyuki Kojima, Hachioji (JP); Kazuhiro Sugawara, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/495,718

(22) PCT Filed: Mar. 22, 2018

(86) PCT No.: PCT/JP2018/011334
§ 371 (c)(1),
(2) Date: Sep. 19, 2019

(87) PCT Pub. No.: WO2018/180856
PCT Pub. Date: Oct. 4, 2018

(65) Prior Publication Data
US 2020/0055399 A1 Feb. 20, 2020

(30) Foreign Application Priority Data
Mar. 31, 2017 (JP) .............................. JP2017-073257

(51) Int. Cl.
*G02B 27/01* (2006.01)
*B60K 35/00* (2006.01)
(Continued)

(52) U.S. Cl.
CPC .......... *B60K 35/00* (2013.01); *G02B 27/0101* (2013.01); *G09G 5/38* (2013.01); *H04N 13/363* (2018.05)

(58) Field of Classification Search
CPC ............ B60K 35/00; B60K 2370/1529; B60K 2370/334; G02B 27/0149; G02B 27/0101;
(Continued)

(56) References Cited

U.S. PATENT DOCUMENTS

2014/0022645 A1* 1/2014 Matsuura ............. G02B 3/0006
359/626
2016/0134848 A1* 5/2016 Watanabe ............... H04N 9/317
345/7
2019/0018250 A1* 1/2019 Kasazumi .......... G02B 27/0179

FOREIGN PATENT DOCUMENTS

EP  2883748  6/2015
JP  04-175094  6/1992
(Continued)

*Primary Examiner* — Towfiq Elahi
(74) *Attorney, Agent, or Firm* — Cozen O'Connor

(57) ABSTRACT

A head-up display apparatus 200 includes: a projection optical system 30 that projects a virtual image; an environment monitor portion 72 as an object detection part that detects an object present in a detection region and detects a distance from the projection optical system 30 to the object as a target distance; an arrangement change apparatus 462 as a projection distance change part that periodically changes a projection distance of a virtual image from the projection optical system 30; and a main control apparatus 90 and a display control portion 18 as an image addition part that adds a related-information image as a virtual image by the projection optical system 30 to the detected object at timing when the target distance substantially matches the projection distance.

20 Claims, 14 Drawing Sheets

(51) Int. Cl.
*H04N 13/363* (2018.01)
*G09G 5/38* (2006.01)

(58) Field of Classification Search
CPC .... G02B 2027/0145; G02B 2027/0154; G02B 2027/0127; G02B 2027/0185
See application file for complete search history.

(56) References Cited

FOREIGN PATENT DOCUMENTS

| | | | |
|---|---|---|---|
| JP | H 11-119147 | 4/1999 | |
| JP | 2008-180759 | 8/2008 | |
| JP | 2009-150947 | 7/2009 | |
| JP | 2011-170186 | 9/2011 | |
| JP | 2015-080988 | 4/2015 | |
| JP | 2015-127160 | 7/2015 | |
| JP | 2016-176983 | 10/2016 | |
| JP | WO 2016/103418 | * 7/2017 | ............. G02B 27/01 |
| WO | WO 2016/103418 | 6/2016 | |

* cited by examiner

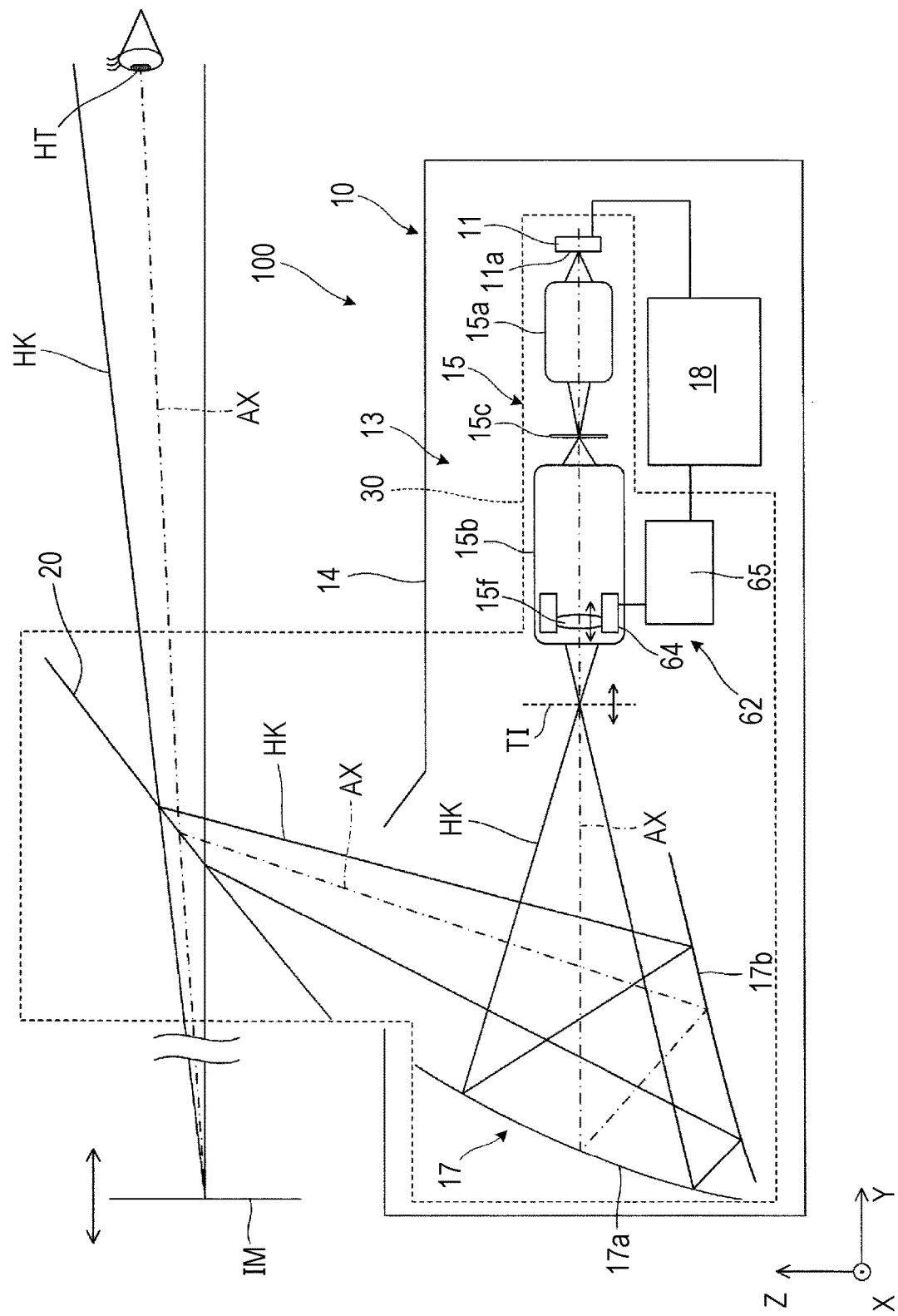

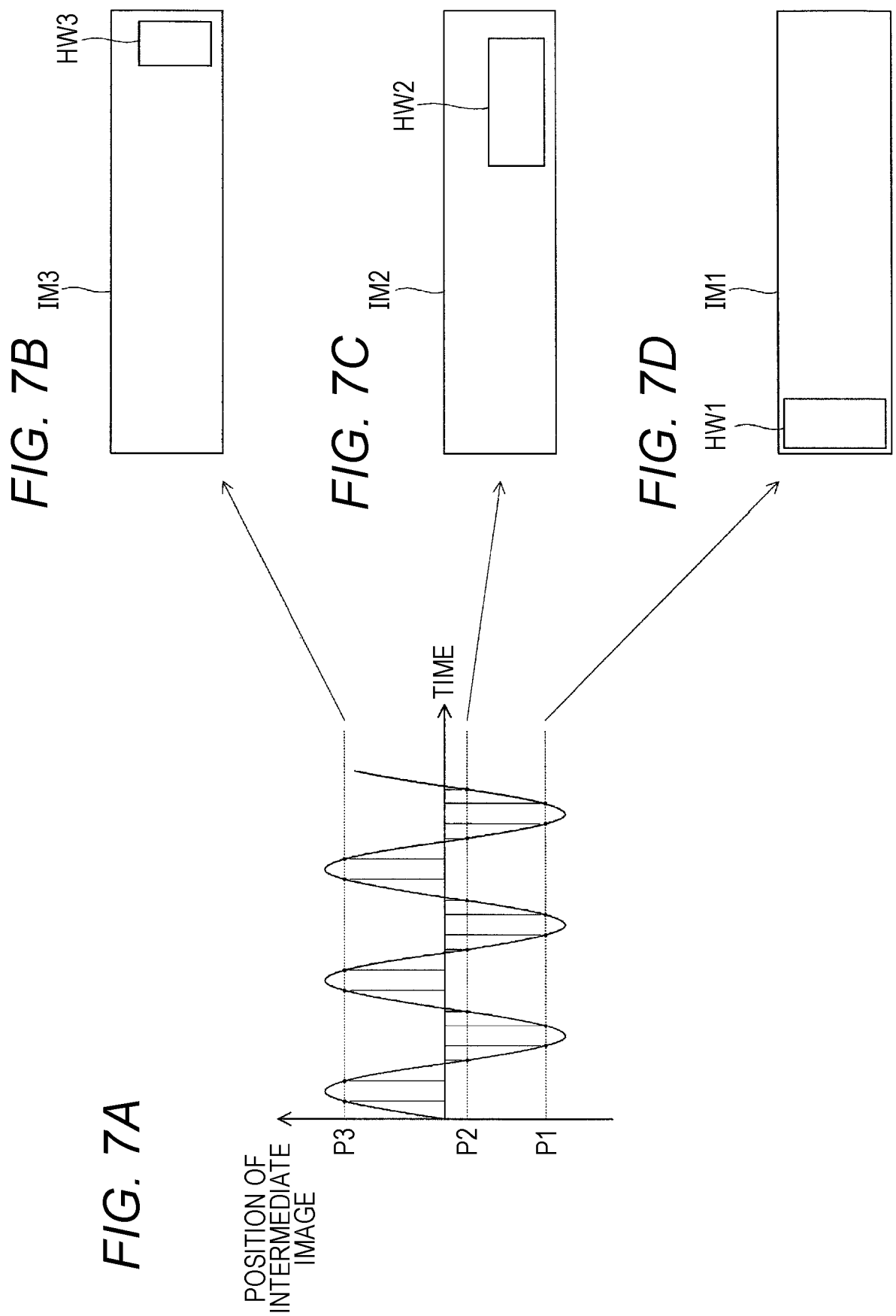

HEAD-UP DISPLAY APPARATUS

RELATED APPLICATIONS

This is a U.S. National Phase Application under 35 USC 371 of International Application PCT/JP2018/011334 filed on Mar. 22, 2018.

This application claims the priority of Japanese application no. 2017-073257 filed Mar. 31, 2017, the entire content of which is hereby incorporated by reference.

TECHNICAL FIELD

The present invention relates to a head-up display apparatus in which a virtual image projection position is variable.

BACKGROUND ART

Conventional automotive head-up display (hereinafter also called the HUD (Head-Up Display)) apparatuses generally generate a virtual image at a constant distance from a driver, and the content of display is limited to vehicle speed, car navigation information, and the like. In the first place, an object of mounting an HUD on a car is to minimize the movement of line of sight of the driver so as to assist safer driving. However, in the sense of safe drive assistance, the aforementioned content of display is insufficient, and a system that senses, for example, a car, a pedestrian, or an obstacle ahead with a camera or other sensors to cause the driver to perceive the danger in advance through the HUD to prevent an accident is more preferable. For achievement of such a system, a conceivable way would be to display a frame-shaped danger signal on a car, a human, an obstacle, or the like in a superimposing manner (see, for example, Patent Literature 1). However, in cases where the distance from the driver to the virtual image is constant, when the position of the eye of the driver is shifted, the positional relationship between a real object and the danger signal is shifted, and there is a problem that excessive shifting would result in misperception by the driver.

Note that, as an HUD apparatus that changes a display distance of a virtual image, those including a scanning-type image formation means, a diffusion screen, a projection means, and a variable means that changes a diffusion screen position, wherein the diffusion screen position is changed to change a projection position of a virtual image in a depth direction are publicly known (see, for example, Patent Literature 2 and 3). These HUD apparatuses, in view of the fact that the distance of observation by a person varies with the speed of a car, reduce the movement of line of sight of a driver by moving the display distance of a virtual image closer or farther (Patent Literature 2) or for the purpose of performing 3D displaying (Patent Literature 3), but do not adjust the display position of a virtual image with respect to an object, e.g., a car, a human, or an obstacle.

Furthermore, when an HUD apparatus is used for the purpose of conveying danger to the driver by, for example, superimposing a virtual image on an object or displaying a virtual image near an object, e.g., a car, a human, or an obstacle, because an event of danger during driving is present regardless of whether the line of sight is close or far, it is preferable that a danger signal be displayed at a far distance and a near distance simultaneously. For this purpose, a conceivable way would be to drive the diffusion screen at fast speed and generate a correspondingly synchronized picture by using an image formation means to show the picture as if it is displayed simultaneously to the human eye. However, it is difficult to handle display switching at high frame rate with the scanning-type image formation means, and therefore the scanning-type image formation means is not suitable for a configuration of displaying a virtual image at a plurality of distances simultaneously.

CITATION LIST

Patent Literature

Patent Literature 1: JP 2015-127160 A
Patent Literature 2: JP 2009-150947 A
Patent Literature 3: JP 2008-180759 A

SUMMARY OF INVENTION

It is an object of the present invention to provide a head-up display apparatus that can add a related-information image as a virtual image in an arrangement relationship including a depth direction with respect to an object, which is a real object.

In order to achieve at least one of the aforementioned objects, a head-up display apparatus reflecting an aspect of the present invention includes: a projection optical system that projects a virtual image; an object detection part that detects an object present in a detection region and detects a distance from the projection optical system to the object as a target distance; a projection distance change part that periodically changes a projection distance of a virtual image from the projection optical system; and an image addition part that adds a related-information image as a virtual image by the projection optical system to the detected object at timing when the target distance substantially matches the projection distance.

BRIEF DESCRIPTION OF DRAWINGS

FIG. 2 is an enlarged cross-sectional side view for explaining a specific configuration example of a projection optical system or the like constituting a head-up display apparatus.

FIG. 7A corresponds to FIG. 4, and FIGS. 7B to 7D correspond to a projection image or a framework of FIG. 6.

DESCRIPTION OF EMBODIMENTS

First Embodiment

A head-up display apparatus of a first embodiment according to the present invention is described below with reference to the drawings.

Figure 1A:
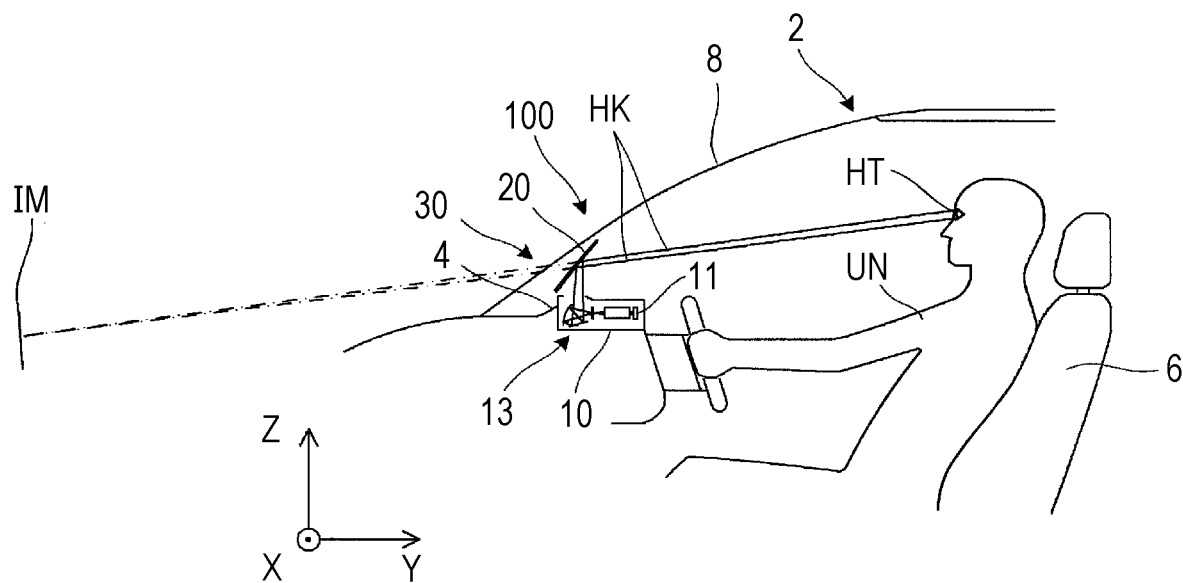
FIG. 1A is a cross-sectional side view illustrating a state in which a head-up display apparatus of a first embodiment is mounted on a vehicle body.
Figure 1B:
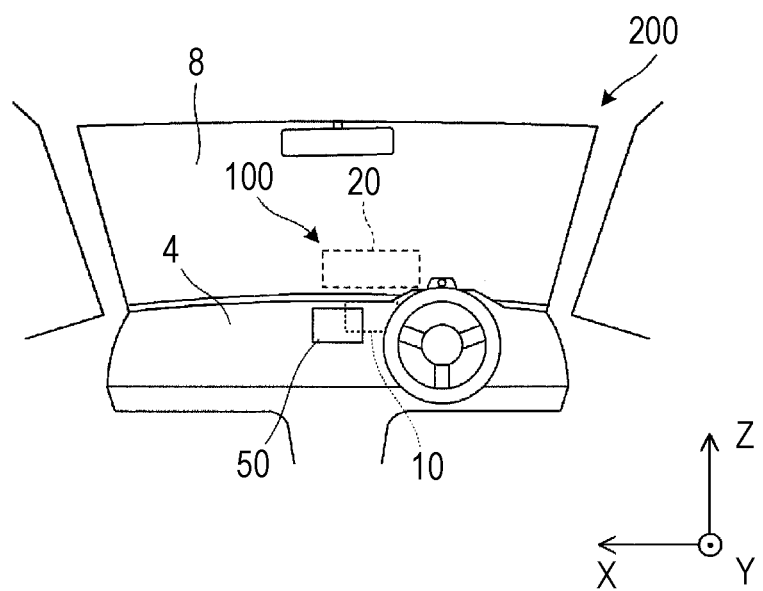
FIG. 1B is a front view for explaining a head-up display apparatus, viewed from inside of a car.

FIGS. 1A and 1B are a conceptual cross-sectional side view and a front view, respectively, for explaining an image display apparatus 100 of the head-up display apparatus of the present embodiment. The image display apparatus 100 is mounted, for example, in a vehicle body 2 of an automobile, and includes a drawing unit 10 and a display screen 20. The image display apparatus 100 displays a virtual image of image information displayed on a display element 11, which will be described later, of the drawing unit 10, for a driver UN via the display screen 20.

The drawing unit 10 of the image display apparatus 100 is installed to be embedded behind a display 50 in a dashboard 4 of the vehicle body 2, and emits display light HK corresponding to an image including drive-related information or the like to the display screen 20. The display screen 20 is also called a combiner, and is a semitransparent concave mirror or plane mirror. The display screen 20 is erected on the dashboard 4 by being supported at a lower end, and reflects the display light HK from the drawing unit 10 to the rear of the vehicle body 2. That is, in the case of the illustrated drawing, the display screen 20 is of an independent type that is installed separately from the windshield 8. The display light HK reflected off the display screen 20 is guided to an eye HT of the driver UN seated on a driving seat 6 and an eyebox (not illustrated) corresponding to a peripheral position. The driver UN can observe the display light HK reflected off the display screen 20, i.e., a projection image IM, which is a virtual image present in front of the vehicle body 2. Meanwhile, the driver UN can observe external light that has passed through the display screen 20, i.e., a real image of a forward view, an automobile, or the like. Eventually, the driver UN can observe the projection image (virtual image) IM including related information, e.g., drive-related information, formed by reflection of the display light HK off the display screen 20 on an external image or see-through image behind the display screen 20.

Here, the display screen 20 is configured separately from the windshield 8, but the windshield 8 may be used as a display screen and projection may be performed over a display range set in the windshield 8 such that the driver UN can observe the projection image IM. In this case, the reflection rate of a partial region of the glass of the windshield 8 can be changed by a coating or the like to ensure a reflection region. Furthermore, when the windshield 8 has a reflection angle of about, for example, 60 degrees, a reflection rate of about 15% is ensured and the windshield 8 can be used as a reflection surface having transparency even without a coating. Apart from the above, the display screen may be provided by being sandwiched in the glass of the windshield 8.

As illustrated in FIG. 2, the drawing unit 10 includes a main body optical system 13, which is a virtual image-type magnifying image formation system including the display element 11, a display control portion 18 that operates the main body optical system 13, and a housing 14 that accommodates the main body optical system 13 and the like. Among the above, a combination of the main body optical system 13 and the display screen 20 constitutes a projection optical system 30.

The main body optical system 13 includes, in addition to the display element 11, an image formation optical system 15 that forms an intermediate image TI obtained when an image formed by the display element 11 is magnified and a virtual image formation optical system 17 that converts the intermediate image TI to a virtual image.

The display element 11 includes a two-dimensional display surface 11a. An image formed on the display surface 11a of the display element 11 is magnified by a first optical portion 15a of the image formation optical system 15 and projected to a diffusion screen 15c. In this case, when the display element 11 capable of two-dimensional display is used, switching of a projection image with respect to the diffusion screen 15c, i.e., switching of the projection image IM displayed as a virtual image through the display screen 20 can be performed at a relatively high speed. The display element 11 may be a reflective element, e.g., a DMD (Digital Mirror Device) or an LCOS (Liquid Crystal On Silicon), or may be a transparent element, e.g., liquid crystal. In particular, use of DMD or LCOS as the display element 11 facilitates retention of brightness and switching of an image at high speed (including high speed intermittent display), which is advantageous for display that changes the virtual image distance or the projection distance. Note that the display element 11 operates at a frame rate of 30 fps or more, more desirably 60 fps or more. Thus, it is possible to show a plurality of projection images (virtual image) IM at different projection distances as if they are simultaneously displayed to the driver UN. In particular, when switching of display at 90 fps or more is performed, the DMD or the LCOS is an option for the display element 11.

The image formation optical system 15 includes a fixed-focus first optical portion 15a, the diffusion screen 15c, and a variable-focus second optical portion 15b. The first optical portion 15a projects an image formed on the display surface 11a of the display element 11 onto the diffusion screen 15c in a magnifying manner, and the second optical portion 15b again projects the image projected onto the diffusion screen 15c in a magnifying manner to form the intermediate image TI (the intermediate image TI itself is based on the display operation of the display element 11). As the diffusion screen 15c, for example, frosted glass, a lens diffusion plate, or a microlens array may be used. The second optical portion 15b includes a movable lens 15f, which is an optical element. The movable lens 15f is movable in an optical axis AX direction by an arrangement change apparatus 62, which will be described later, and the focal length of the second optical portion 15b increases or decreases according to the movement of the movable lens (optical element) 15f in the optical axis AX direction, such that the position of the intermediate image TI as an image formation or focus position (when the display of the display element 11 is not operated, the intermediate image, which is display, is not necessarily formed, but the position in which the intermediate image is to be formed is also called the position of the intermediate image) also can be moved in the optical axis AX direction. Although depending on the lens configuration of the second optical portion 15b or the like, for example, when the movable lens 15*f* is moved to the virtual image formation optical system 17 side, the position of the intermediate image TI is moved to the virtual image formation optical system 17 side such that the virtual image distance to the projection image IM can be reduced. Furthermore, when the movable lens 15*f* is moved to the display element 11 side, the position of the intermediate image TI is moved to the display element 11 side such that the virtual image distance to the projection image IM can be increased.

The virtual image formation optical system 17 magnifies the intermediate image TI formed by the image formation optical system 15 in cooperation with the display screen 20, and forms the projection image IM, which is a virtual image, in front of the driver UN. The virtual image formation optical system 17 includes at least one mirror, and includes two mirrors 17*a* and 17*b* in the illustrated example.

The arrangement change apparatus 62 provided and attached to the movable lens 15*f* is a projection distance change part that moves the movable lens 15*f* or the intermediate image TI to a desired position along the optical axis AX and periodically changes the projection distance from the projection optical system 30 to the projection image IM, which is a virtual image. The arrangement change apparatus (projection distance change part) 62 includes a movable mechanism 64 that enables movement of the movable lens 15*f* in the optical axis AX direction and a drive portion 65 that moves the movable lens 15*f* back and forth via the movable mechanism 64 in the optical axis AX direction at a desired speed. When, for example, a motor is used as the drive portion 65, in order to reduce loads on the motor, it is desirable that the movable mechanism 64 include a spring that facilitates the back and forth movement or vibration of the movable lens 15*f*. When the movable lens 15*f* is moved by the arrangement change apparatus 62 along the optical axis AX, the distance between the projection image IM, which is a virtual image formed behind the display screen 20 by the virtual image formation optical system 17 and the driver UN, which is an observer, can be increased or reduced. Thus, when the position of the projection image IM to be projected is changed to and fro and the content of display is selected to be suitable for its position, the virtual image distance to the projection image IM is changed and the content of display of the projection image IM is changed, and the projection image IM, which is a series of projection images, can be a three-dimensional thing.

The movement speed of the movable lens 15*f* is desirably a speed at which the projection image IM, which is a virtual image, is shown as they are simultaneously displayed at a plurality of locations or at a plurality of virtual image distances. For example, when the projection image IM is sequentially projected in three stages: far distance, intermediate distance, close distance, and is displayed by the display element 11 at 90 fps, the projection image IM at each distance (e.g., far distance) is subject to switching of display at 30 fps, and the projection images IM at intermediate distance and close distance are switched concurrently and recognized as a series. In this case, the movement speed of the movable lens 15*f* is set to be synchronized with the display operation of the display element 11. The movement speed of the movable lens 15*f* needs to correspond to 30 fps or more, which is an operation rate of the display element 11. Apart from use of a spring mechanism, for example, a wheel on which a large number of lenses is arranged on the circumference is rotated about a central axis parallel to the optical axis AX, and the large number of lenses is sequentially arranged on the optical axis AX, such that the large number of lenses is switched at high speed.

In the case of the projection optical system 30 illustrated in FIG. 2, there is an advantage that even when the size of the diffusion screen 15*c* increases when the magnification of a relay optical system is increased to enlarge the observable range (i.e., eyebox) after movement of the eye of the driver UN, which is an observer, it is not necessary to move the diffusion screen 15*c*, and the movement mechanism will not be large in scale.

Figure 3:
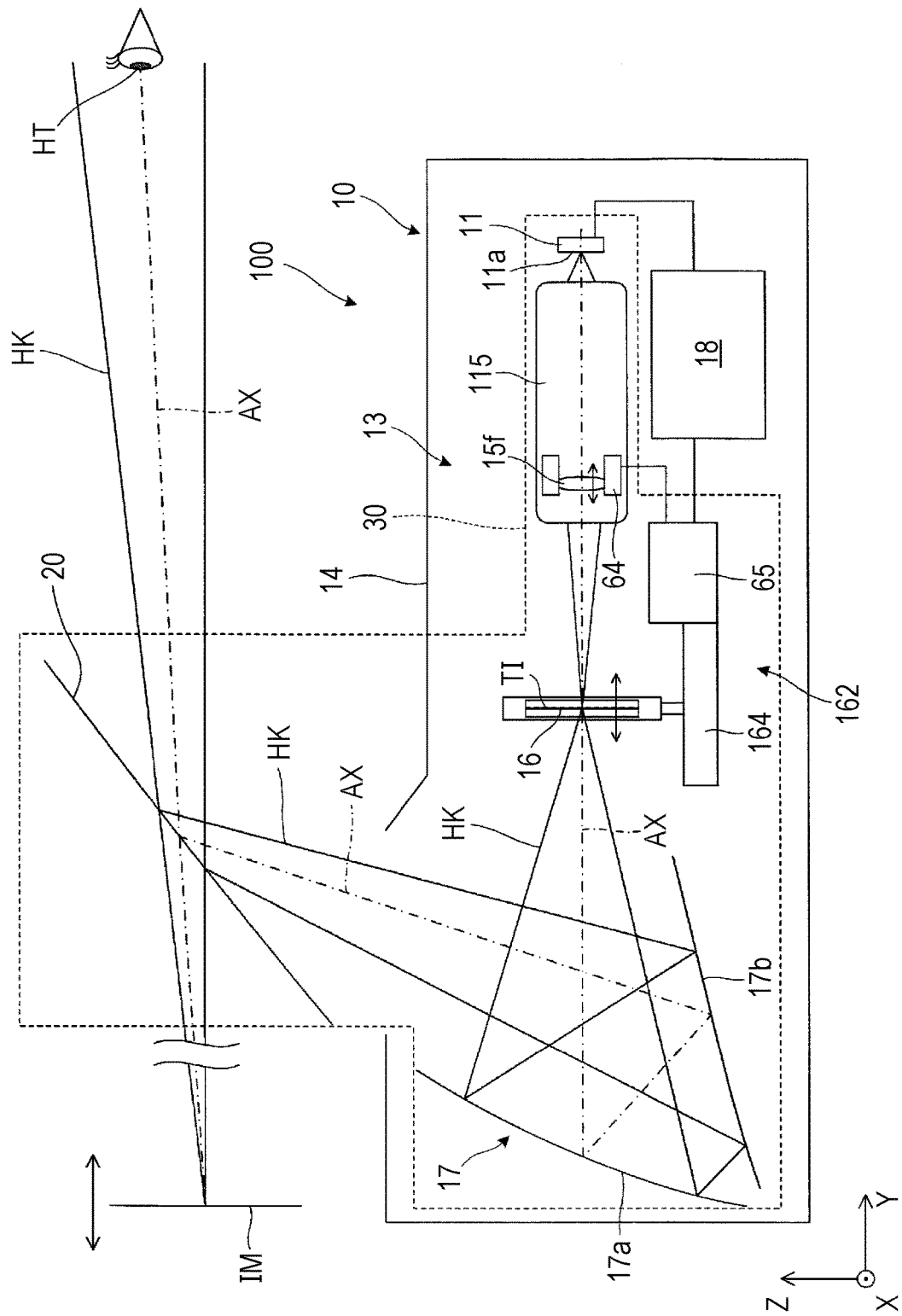
FIG. 3 is a diagram for explaining a variation of the optical system of FIG. 2.

FIG. 3 is a view for explaining a variation of the projection optical system 30 illustrated in FIG. 2. The image formation optical system 115 projects an image formed on the display element 11 in a magnifying manner to form the intermediate image TI. The image formation optical system 115 includes the movable lens 15*f*, which is an optical element. The movable lens 15*f*, as in the case of FIG. 2, is movable by the arrangement change apparatus 162 in the optical axis AX direction, the focal length of the image formation optical system 115 increases or decreases according to the movement of the movable lens (optical element) 15*f* in the optical axis AX direction, and the position of the intermediate image TI, which is an image formation or focus position, also can be moved in the optical axis AX direction. In this case, the intermediate image is not formed in the image formation optical system 115. In the optical system illustrated in FIG. 3, the diffusion screen 16, which is an optical element, that moves in the optical axis AX direction is arranged at or in the vicinity of the image formation optical system 115. The diffusion screen 16 is movable in the optical axis AX direction by a guide portion 164 provided on the arrangement change apparatus 162 and the drive portion 65, and moves together with the intermediate image TI formed by the image formation optical system 115. That is, the diffusion screen 16 operates in synchronization with the movable lens 15*f* and is arranged at the position of the intermediate image TI, which moves, in synchronization with the intermediate image TI. The projection optical system 30 illustrated in FIG. 3 is configured to connect the intermediate image only one time, and therefore when an increase in size of the movement mechanism is suppressed when the number of movement lenses is a few, the size of the optical system can be reduced.

Figure 4:
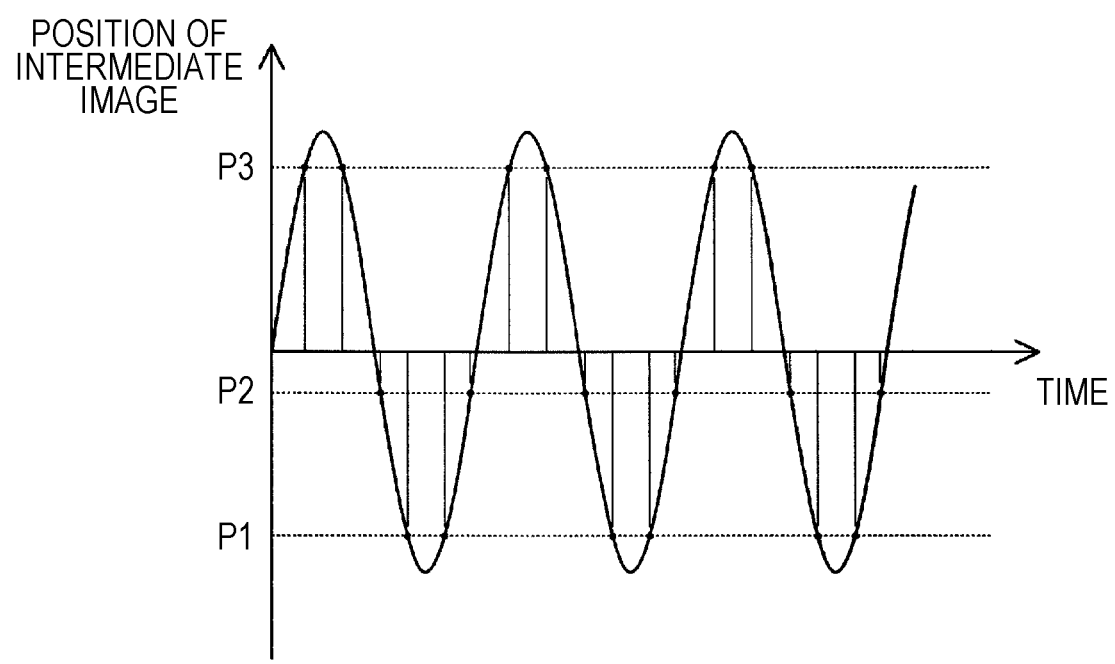
FIG. 4 is a graph specifically illustrating a change in position of an intermediate image, a graph conceptually explaining a change in projection distance.

FIG. 4 is a graph specifically illustrating a change in position of the intermediate image TI according to the movement of the movable lens 15*f*. The movable lens 15*f* moves back and forth in a sinusoidal temporal pattern along the direction of the optical axis AX, and the position of the intermediate image TI also moves back and forth in a sinusoidal temporal pattern along the direction of the optical axis AX as illustrated in the drawing when the display element 11 performs continuous display. That is, the position of the intermediate image TI continuously varies with the movement of the movable lens 15*f*. As a result, although illustration is omitted, the position of the projection image (virtual image) IM also moves back and forth along the direction of the optical axis AX similar to the position of the intermediate image TI although scale is different, and the projection distance can be changed continuously. Here, the display element 11 does not perform continuous display, but performs intermittent display while switching the content of display, and therefore the display position of the intermediate image TI also becomes a discrete position on the sinusoidal temporal pattern. In the illustrated example, regarding the position of the intermediate image TI on the optical axis AX, three points are display positions P1 to P3. Here, the display positions P1 to P3 correspond to positions of the intermediate image TI at timing when the display element 11 performs display operation. That is, the display element 11 intermittently performs display operation, and because display is performed two times at each of the display positions P1 to P3, display is performed six times in total within one period of the movable lens 15*f*.

Figure 5:
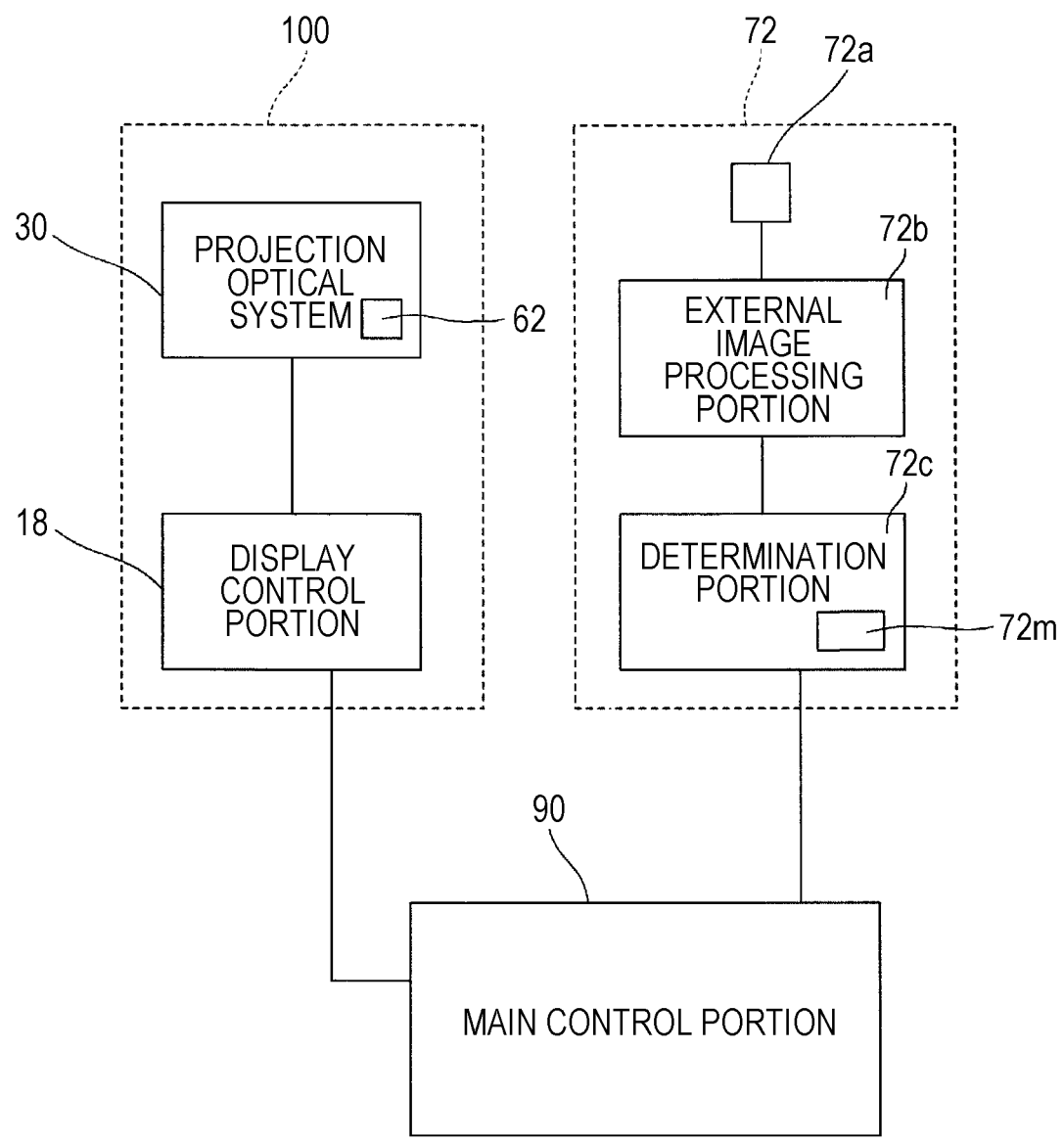
FIG. 5 is a block diagram for explaining an entire structure of a head-up display apparatus.

FIG. 5 is a block diagram for explaining an entire structure of a head-up display apparatus 200, and the head-up display apparatus 200 includes the image display apparatus 100 as its portion. The image display apparatus 100 has the structure illustrated in FIG. 2, and a description is omitted here.

The head-up display apparatus 200 includes, in addition to the image display apparatus 100, an environment monitor portion 72 and a main control apparatus 90.

The environment monitor portion 72 is an object detection part that detects an object present in the detection region, and includes a three-dimensional measurement instrument that identifies a movable body or a human present ahead in the vicinity, specifically, an automobile, a bicycle, a pedestrian, or the like, as an object, and extracts three-dimensional position information of the object. Thus, the three-dimensional recognition of the object enables three-dimensional display of a related-information image. Furthermore, the environment monitor portion 72 adds a related-information image, which is a virtual image, to a movable body or a human, and can let the driver UN or the like of the head-up display apparatus 200 to know the presence of the movable body or the human. The environment monitor portion (object detection part) 72 includes, as the three-dimensional measurement instrument, an external camera 72*a*, an external image processing portion 72*b*, and a determination portion 72*c*. The external camera 72*a* enables capture of an external image in a visible or infrared area. The external camera 72*a* is installed at an appropriate position of the vehicle body 2 internally or externally, and captures a detection region VF (see FIG. 6 to be described later) in front of the driver UN or the windshield 8 as an external image. The external image processing portion 72*b* performs various image processing, e.g., brightness correction, on the external image captured by the external camera 72*a* to facilitate processing by the determination portion 72*c*. The determination portion 72*c* extracts or cuts an object image from the external image after the external image processing portion 72*b* so as to detect the presence or absence of an object (see specifically objects OB1, OB2 and OB3 of FIG. 6, which will be described later), e.g., an automobile, a bicycle, a pedestrian, or the like, calculates the spatial position of the object in front of the vehicle body 2 from the depth information associated with the external image, and stores the spatial position in a storage portion 72*m* as three-dimensional position information. The storage portion 72*m* of the determination portion 72*c* stores software that enables extraction of an object image from an external image, and during operation of extracting the object image from the external image, required software or data is read from the storage portion 72*m*. The determination portion 72*c* can detect what is an object corresponding to the object element, for example, from the shape, the size, the color, or the like of each object element in the obtained image. Determination criteria include a method for performing pattern matching with respect to pre-registered information to detect what is an object from the degree of matching. Furthermore, from a viewpoint of increasing processing speed, a lane is sensed from an image, and for a target or an object element in the lane, the object can be detected from the aforementioned shape, size, color, or the like.

The external camera 72*a*, although illustration is omitted, is, for example, a compound-eye type three-dimensional camera. That is, the external camera 72*a* includes camera elements each formed of a pair of an image formation lens and a capture element, e.g., CMOS (Complementary metal oxide semiconductor) and arranged in a matrix fashion, and includes a drive circuit for the capture element. The plurality of camera elements constituting the external camera 72*a* is, for example, brought into focus on different positions in the depth direction or can detect a relative parallax. When the state of an image obtained from the camera elements (focus state, position of object, or the like) is analyzed, a target distance to each region or object in the image corresponding to the detection region can be determined.

Note that, even when a combination of a two-dimensional camera and an infrared distance sensor is used instead of the aforementioned compound eye-type external camera 72*a*, it is possible to obtain a target distance, which is distance information in the depth direction, regarding each portion (region or object) in the captured screen. Furthermore, instead of the compound eye-type external camera 72*a*, it is possible to obtain a target distance, which is distance information in the depth direction, regarding each portion (region or object) in the captured screen with a stereo camera in which two two-dimensional cameras are separately arranged. In addition, when capture is performed with a single two-dimensional camera while the focal length is changed at high speed, it is possible to obtain a target distance, which is distance information in the depth direction, regarding each portion (region or object) in the captured screen.

Furthermore, when LIDAR (Light Detection and Ranging) technology is used instead of the compound eye-type external camera 72*a*, it is possible to obtain distance information in the depth direction regarding each portion (region or object) in the detection region. With the LIDAR technology, scattered light with respect to pulsed laser emission is measured, and the distance or expansion to a target at a far distance is measured to acquire information of distance to an object within a field of view or information regarding expansion of the object. Moreover, for example, a composite method, e.g., a combination of laser sensing technology like the LIDAR technology and a technology of detecting the distance of an object from image information, i.e., a method of fusing a plurality of sensors, can increase the precision of detecting the object.

The operation rate of the external camera 72*a* for detecting the object needs to be equal to or more than the operation rate of the display element 11 from a viewpoint of high speed input, and when the display element 11 has an operation rate of 30 fps or more, the operation rate of the external camera 72*a* needs to be equivalent or higher than the operation rate of the display element 11. The external camera 72*a* desirably enables high speed detection of an object through high speed operation, e.g., higher than 120 fps, e.g., 480 fps or 1000 fps. Furthermore, when a plurality of sensors is fused, not all the sensors need to be high speed, but at least one of the plurality of sensors needs to be high speed and the other sensors may not be high speed. In this case, a method of increasing the sensing precision such that data detected by the high speed sensor is primarily used and data by the non-high speed sensors is used for complimentary may be used.

The display control portion 18 operates the projection optical system 30 under control by the main control apparatus 90 and causes the three-dimensional projection image IM that varies in virtual image distance or projection distance to be displayed behind the display screen 20.

The main control apparatus 90 has a role of harmonizing the operations of the image display apparatus 100, the environment monitor portion 72, and the like. The main control apparatus 90 appropriately operates the arrangement change apparatus 62 via, for example, the display control portion 18 to periodically change the projection distance of the virtual image, which is the projection image IM by the projection optical system 30. That is, the main control apparatus 90 and the like periodically change the projection position regarding the depth direction of the virtual image, which is the projection image IM. In this case, at an appropriate position in the process of periodical back and forth movement of the projection position, the related-information image can be given to the object. Furthermore, the main control apparatus 90 adjusts a spatial arrangement of a framework HW (see FIG. 6) projected by the projection optical system 30 so as to correspond to the spatial position of the object detected by the environment monitor portion 72. In short, the main control apparatus 90 generates the projection image IM displayed by the projection optical system 30 from the display information including the display shape or display distance received from the environment monitor portion 72. The projection image IM can be a sign like the framework HW (see FIG. 6) positioned in a peripheral area regarding the depth position direction with respect to, for example, an automobile, a bicycle, a pedestrian, and other objects present behind the display screen 20. As described above, the main control apparatus 90 functions as an image addition part in cooperation with the display control portion 18, and adds the related-information image as a virtual image by means of the projection optical system 30 to the detected object at timing when the target distance to the detected object substantially matches the projection distance. The related-information image is, for example, the framework HW surrounding the object or an index adjacent to the object. In this case, it is possible to convey the presence of a movable body or a human by means of the framework HW or the index.

In order for the observer to be able to view the related-information image as three-dimensional display at the same time or substantially at the same time as the object by displaying the related-information image at high speed with the configuration of the present embodiment, sensing, processing, e.g., recognition and determination, and display need to be high speed. Therefore, the delay (latency) of display is absent when the related-information image is superimposed and displayed on the object or target present in an actual scene, and a feeling of wrongness while the observer or the driver UN views the display or the virtual image is reduced, enabling quick driving operation, e.g., accident prevention or the like.

Figure 6:
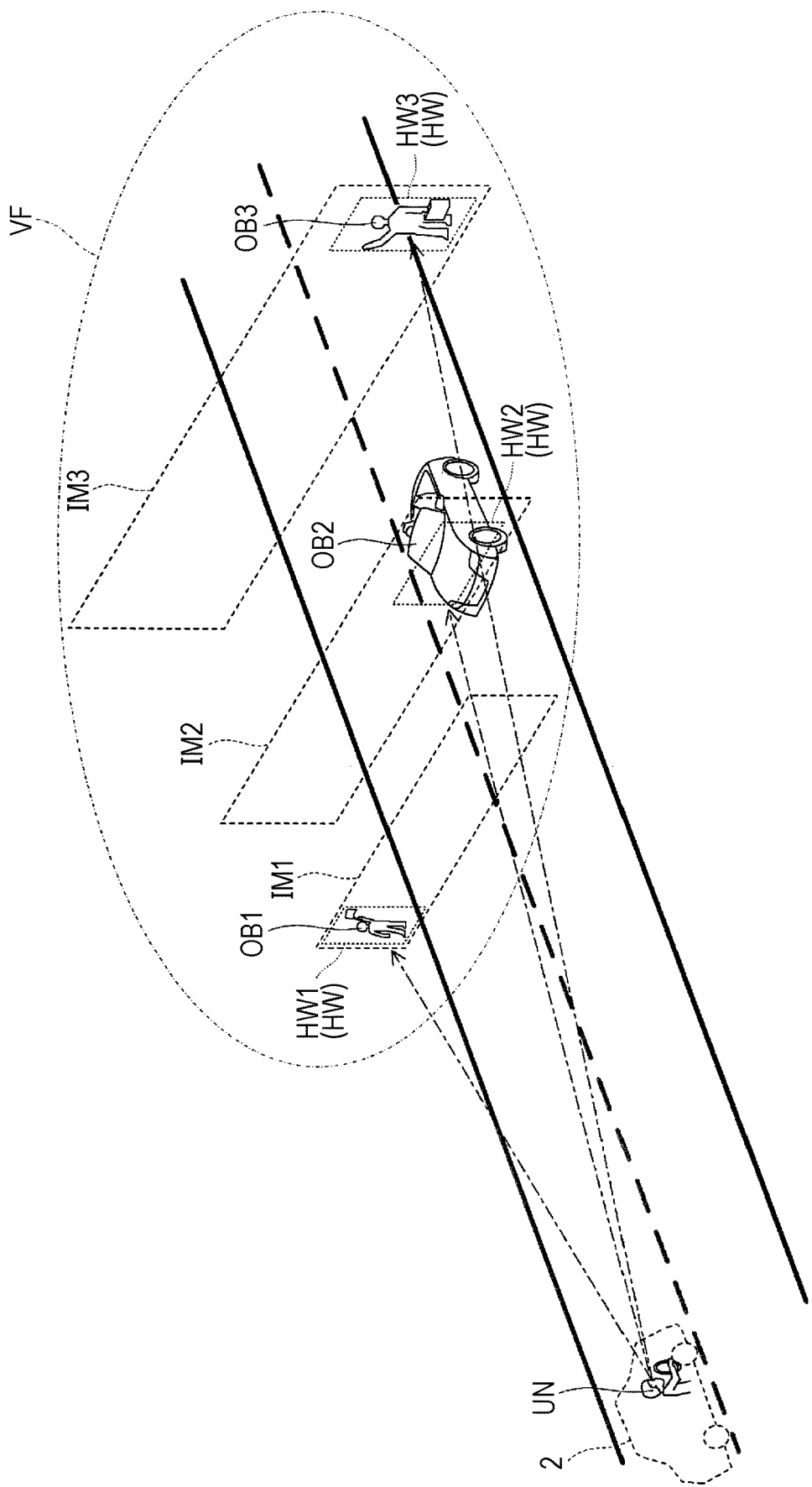
FIG. 6 is a perspective view for explaining a specific display state.

FIG. 6 is a perspective view for explaining a specific display state. The front side of the driver UN, which is an observer, is the detection region VF corresponding to the observation field. In the detection region VF, i.e., on a road or a surrounding area, object OB1, which is a human, e.g., a pedestrian, or object OB2, which is a movable body, e.g., an automobile, is deemed present. In this case, the main control apparatus 90 projects the three-dimensional projection image (virtual image) IM by the image display apparatus 100, and adds frameworks HW1, HW2 and HW3, which are related-information images, to the objects OB1, OB2 and OB3. In this case, because the distance from the driver UN to the objects OB1, OB2 and OB3 is different, the projection distance to the projection images IM1, IM2 and IM3 for displaying the frameworks HW1, HW2 and HW3 corresponds to the distance from the driver UN to the objects OB1, OB2 and OB3. Note that the projection distance of the projection images IM1, IM2 and IM3 is discrete and cannot correctly match the actual distance to the objects OB1, OB2 and OB3. However, when a difference between the projection distance of the projection images IM1, IM2 and IM3 and the actual distance to the objects OB1, OB2 and OB3 increases, a parallax is less likely to occur even when the viewpoint of the driver UN moves, and the arrangement relationship between the objects OB1, OB2 and OB3 and the frameworks HW1, HW2 and HW3 can be substantially maintained.

FIG. 7A corresponds to FIG. 4, FIG. 7B corresponds to the projection image IM3 or the framework HW3 of FIG. 6, FIG. 7C corresponds to the projection image IM2 or the framework HW2 of FIG. 6, and FIG. 7D corresponds to the projection image IM1 or the framework HW1 of FIG. 6. As is apparent from FIGS. 7A to 7D, the projection image IM1 corresponds to the display image formed on the display surface 11a of the display element 11 when the intermediate image TI is in the display position P1, the projection image IM2 corresponds to the display image formed on the display surface 11a of the display element 11 when the intermediate image TI is in the display position P2, and the projection image IM3 corresponds to the display image formed on the display surface 11a of the display element 11 when the intermediate image TI is in the display position P3. When the movement of the intermediate image TI is viewed with reference to one period, first, the projection image IM3 or the framework HW3 corresponding to the display position P3 is displayed, and then the projection image IM3 or the framework HW3 corresponding to the display position P3 is re-displayed. Then, after the projection image IM2 or the framework HW2 corresponding to the display position P2 is displayed, the projection image IM1 or the framework HW1 corresponding to the display position P1 is displayed. Then, the projection image IM1 or the framework HW1 corresponding to the display position P1 is displayed, and the projection image IM2 or the framework HW2 corresponding to the display position P2 is displayed. When the above one period is visually short, switching of the projection images IM1, IM2 and IM3 is very fast, and the driver UN, who is an observer, recognizes as simultaneously observing the frameworks HW1, HW2 and HW3 as images having depth.

Figure 8A:
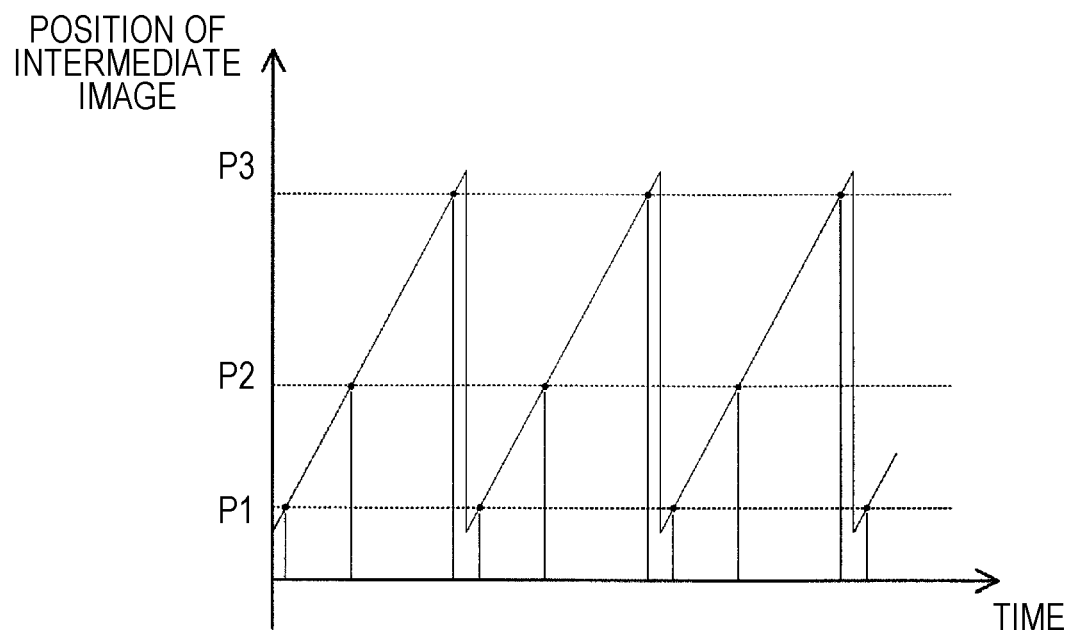
FIGS. 8A and 8B are graphs for explaining a variation related to a change in position of an intermediate image or projection distance illustrated in FIG. 4.
Figure 8B:
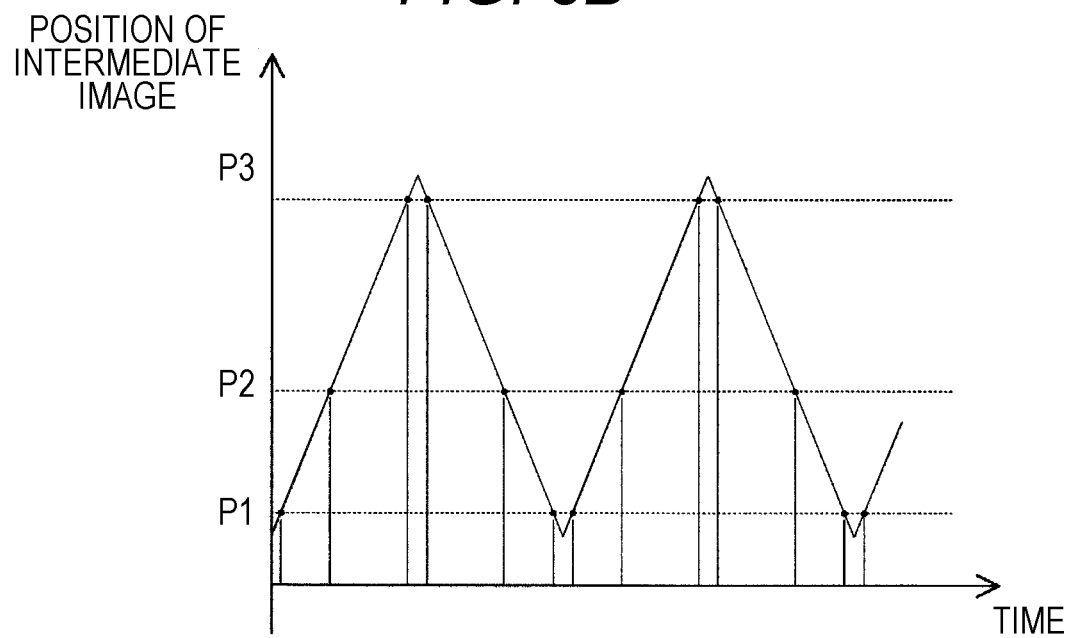

As described above, the display position of the intermediate image TI is changed in a sinusoidal temporal pattern, but the display position of the intermediate image TI is not limited to a sinusoidal temporal pattern, but may be changed in a serrated temporal pattern (FIG. 8A) or may be changed in a triangular wave temporal pattern (FIG. 8B). Similarly, in these cases, the projection distance of the projection image IM is changed continuously.

Figure 9A:
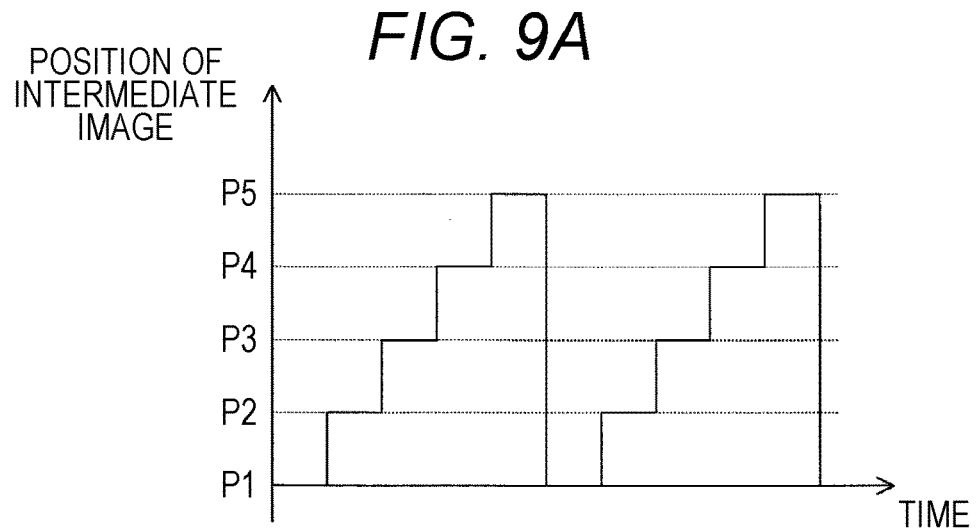
FIGS. 9A to 9C are graphs for explaining a variation related to a change in position of an intermediate image or projection distance illustrated in FIG. 4.
Figure 9B:
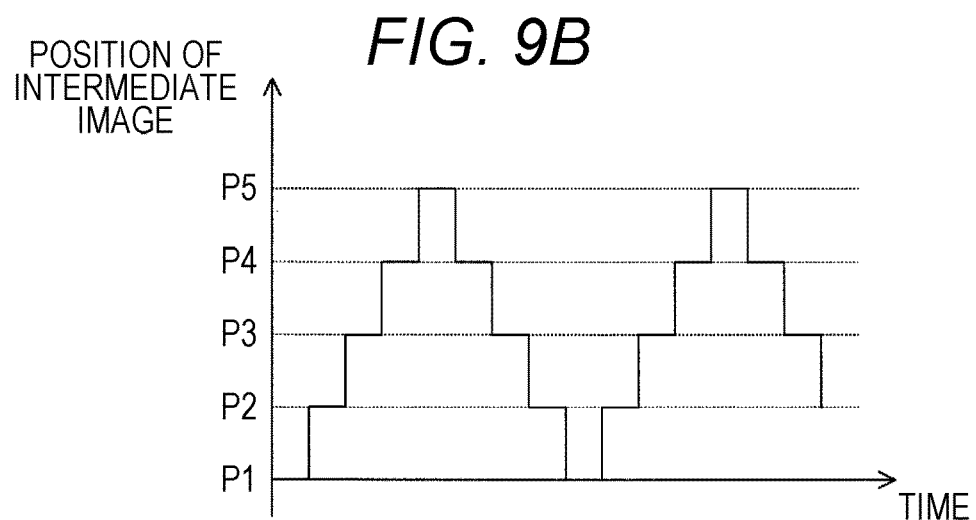
Figure 9C:
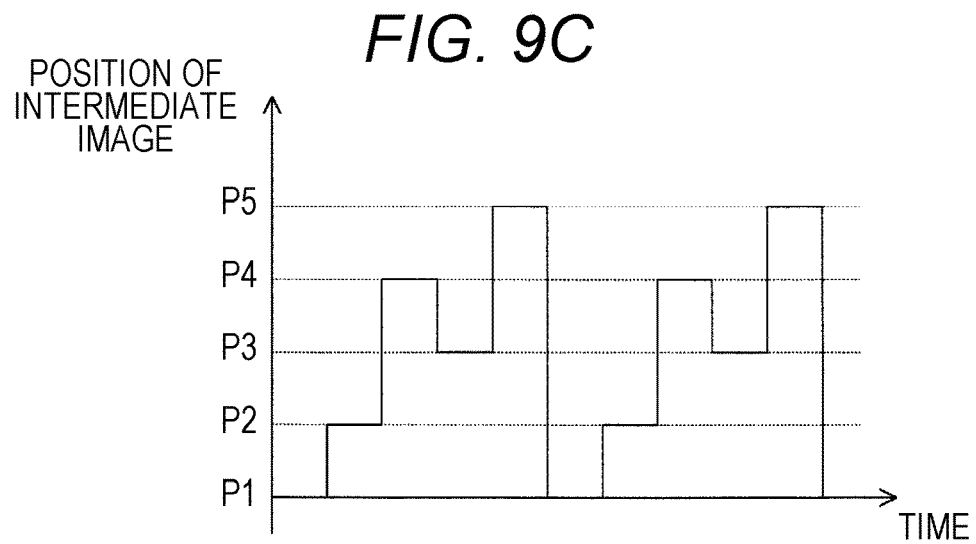

The display position of the intermediate image TI can be changed in a staircase temporal pattern (FIGS. 9A and 9B). The case of a change in a staircase temporal pattern includes a case where the display position of the intermediate image TI is not changed in a staircase fashion and increases and decreases complexly (FIG. 9C). In these cases, the projection distance of the projection image IM is changed in stages. In addition to these patterns, a state in which the display position is periodically changed without a simple increase or reduction in distance change, e.g., a repetition of P1→P3→P2→P4→P5, and a state in which, for example, the time or pattern of one stroke of the distance change of the display position from P1 to P5 varies with each stroke but the time or pattern is periodically changed in the strokes can also be said to be a periodic change.

With the head-up display apparatus 200 according to the first embodiment described above, the arrangement change apparatus (projection distance change part) 62 can periodically change the projection distance, and the image addition part (main control apparatus 90 and display control portion 18) adds the frameworks HW1, HW2 and HW3 as the related-information image as the virtual image by the projection optical system 30 to the objects OB1, OB2 and OB3 for which the target distance has been detected at timing substantially matching the projection distance, and therefore the related-information image can be three-dimensionally added to the objects OB1, OB2 and OB3 at a varying period of the projection distance. Note that the frameworks HW1, HW2 and HW3 are three-dimensionally displayed in the depth direction, and even when the viewpoint of the observer is shifted in the eyebox, the frameworks HW1, HW2 and HW3 are not misaligned or less likely to be misaligned with respect to the objects OB1, OB2 and OB3.

Second Embodiment

A head-up display apparatus according to a second embodiment is described below. Note that the head-up display apparatus of the second embodiment is a modification of the head-up display apparatus of the first embodiment, and matters not particularly described are similar to those of the first embodiment.

Figure 10:
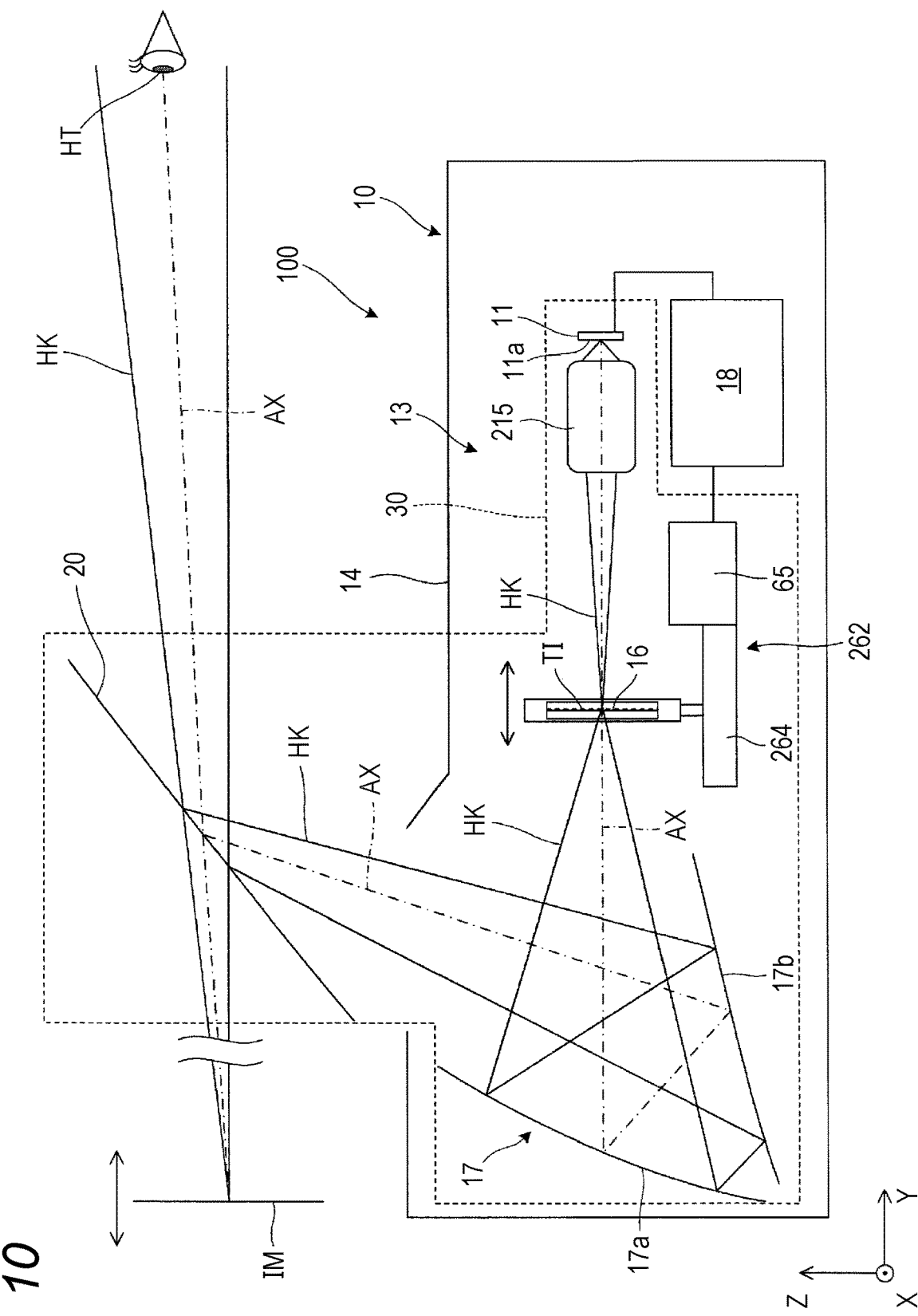
FIG. 10 is a diagram for explaining a head-up display apparatus of a second embodiment.

As illustrated in FIG. 10, an image formation optical system 215 provided on the image display apparatus 100 magnifies an image formed on the display element 11. In this case, an F value on the image side of the image formation optical system 215 is set to be relatively large, and the diffusion screen 16, which is an optical element that moves in the optical axis AX direction, is arranged at the image formation position (i.e., at or in the vicinity of the position where the intermediate image is to be formed) of the image formation optical system 215. Here, when the movement range of the diffusion screen 16 is set within the depth of focus of the image formation optical system, regarding the image of the intermediate image TI formed on the diffusion screen 16, the blur occurring when the diffusion screen 16 moves from the image formation position of the image formation optical system 215 becomes an extent negligible for the observer, and the image becomes relatively clear. The diffusion screen 16 is a diffusion plate that controls a light distribution angle to a desired angle, and, for example, frosted glass, a lens diffusion plate, a microlens array or the like is used.

The main control apparatus 90 and the display control portion 18, which are control portions, periodically shift the position of the diffusion screen 16 via the arrangement change apparatus (projection distance change part) 262 to periodically shift the position of the intermediate image TI to periodically change the projection distance such that the image formed on the display element 11 corresponds to the projection distance. Specifically, a guide portion 264 and the drive portion 65 constituting the arrangement change apparatus (projection distance change part) 262 moves the diffusion screen 16 back and forth in the optical axis AX direction to periodically change the projection distance. Thus, the projection distance is changed periodically, and at timing when the target distance substantially matches the projection distance by the main control apparatus 90 and the display control portion 18, the image display apparatus 100 adds the frameworks HW1, HW2 and HW3 as related-information images as virtual images to the objects OB1, OB2 and OB3 detected by the environment monitor portion (object detection part) 72. With such a configuration, even when a mechanism that varies focus is not provided in the image formation optical system 215, because the projection position of the virtual image is variable and the projection position is variable by a simple configuration, it can be said that it is a configuration desirable for a reduction in size of the apparatus.

Regarding the intermediate image TI, the amount of blur or out of focus of an image is desirably small. Meanwhile, when the position of the intermediate image TI is changed largely, a difference in projection position in the depth direction of the projection image (virtual image) IM formed thereby is ensured to enable expansion of a three-dimensional display range. In view of the above, the image formation optical system 215 desirably satisfies conditional expression (1) described below.

$$0.8 \leq 2 \times F \times P \times m^2/\delta \leq 1.2 \quad (1)$$

However, value F indicates F number on the display element 11 side of the image formation optical system 215, value P indicates pixel pitch [mm] of the display element 11, and value δ indicates amount of diffusion screen movement [mm] required for obtaining a desired virtual image distance range. Value $2 \times F \times P \times m^2/\delta$ in the above conditional expression (1) is a use rate of depth of focus, and being in a range of satisfying the above conditional expression (1) can reduce out of focus at each position in the movement range of the diffusion screen 16. Therefore, it is possible to display a clear virtual image in a desired virtual image distance range.

Third Embodiment

A head-up display apparatus according to a third embodiment is described below. Note that the head-up display apparatus of the third embodiment is a modification of the head-up display apparatus of the first embodiment or the second embodiment, and matters not particularly described are similar to those of the first embodiment or the like.

Figure 11:
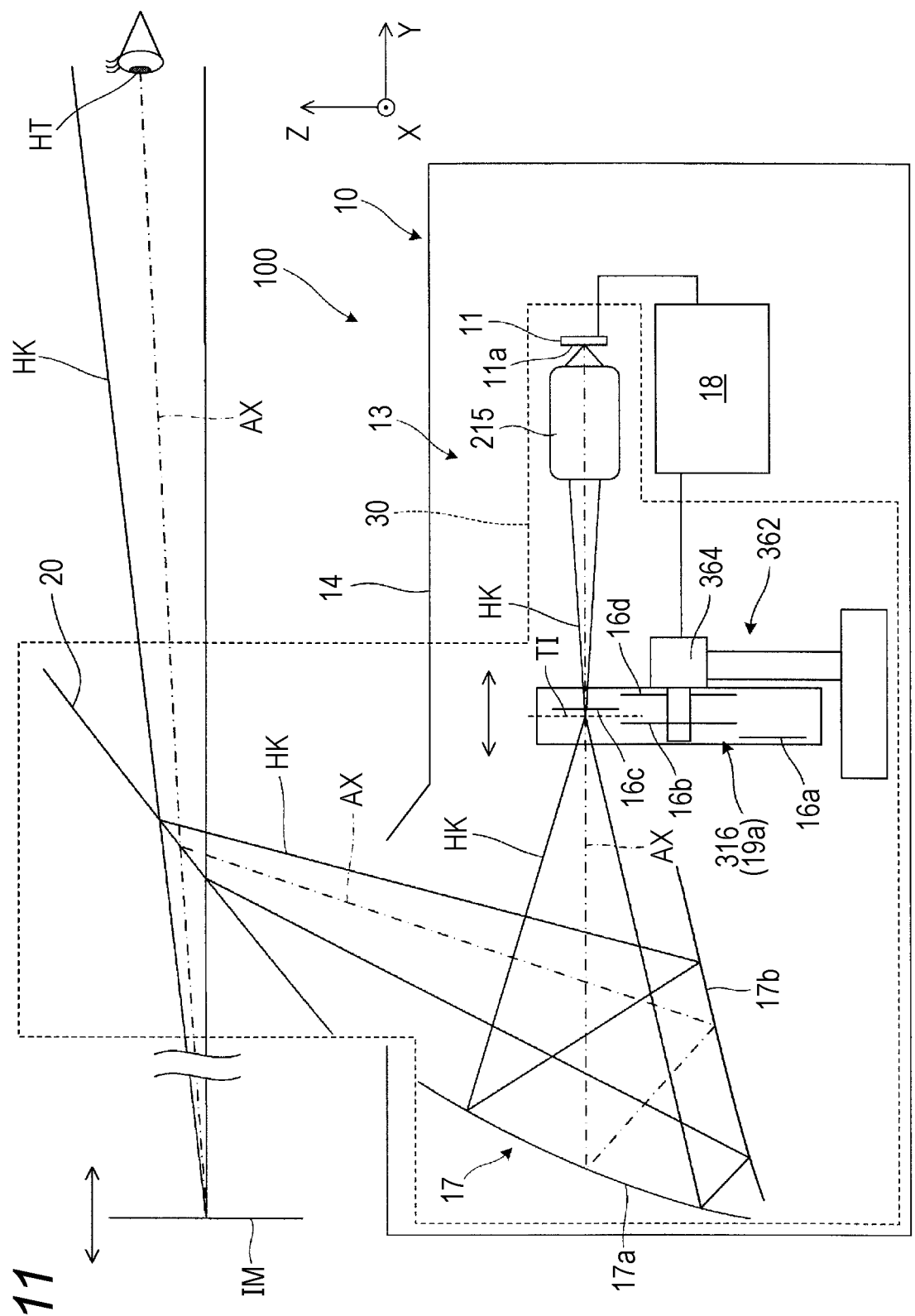
FIG. 11 is a diagram for explaining a head-up display apparatus of a third embodiment.

As illustrated in FIG. 11, in the image display apparatus 100, the diffusion screen 316, which is an optical element, is provided as a rotary body 19a at the image formation position (i.e., at or in the vicinity of the position where an intermediate image is to be formed) of the image formation optical system 215. The rotary body 19a, which is the diffusion screen 316, is driven by a rotary drive apparatus 364 provided on the arrangement change apparatus (projection distance change part) 362 and rotates at a constant rate, at a substantially constant rate, or at a periodically changing rate. The rotary body 19a includes a plurality of diffusion regions 16a to 16d. These diffusion regions 16a to 16d are different in position with respect to the direction of the optical axis AX, but are sequentially arranged at the image formation position of the image formation optical system 215 in association with the rotation of the rotary body 19a.

Figure 12A:
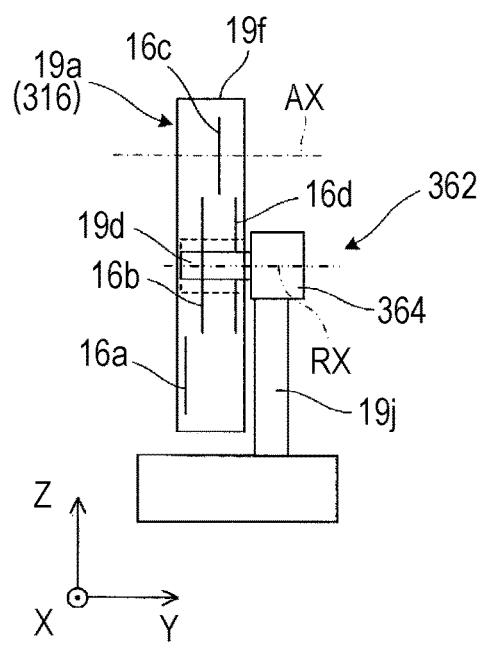
FIGS. 12A and 12B are views for explaining a structure of a diffusion screen.
Figure 12B:
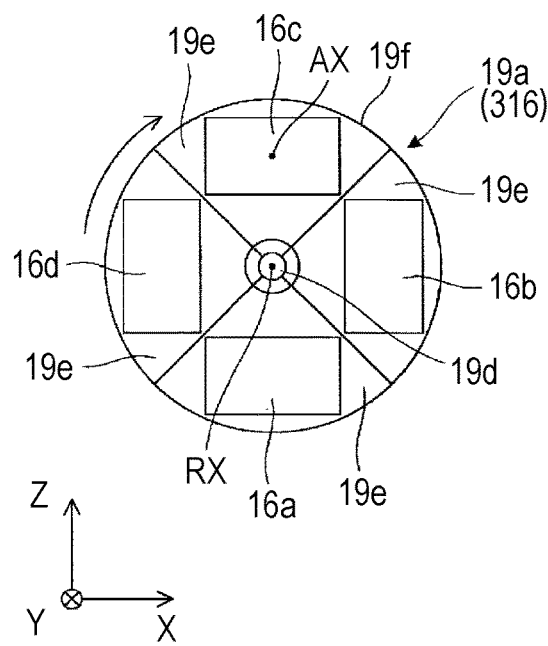

FIG. 12A is a cross-sectional side view for explaining the diffusion screen 316 and the arrangement change apparatus (projection distance change part) 362, and FIG. 12B is a front view for explaining the diffusion screen 316. The rotary body 19a, which is the diffusion screen 316, includes: a shaft portion 19d through which a rotation axis RX that extends parallel to the optical axis AX passes, a support 19f including four support regions 19e supported by the shaft portion 19d and arranged around the rotation axis RX, and four diffusion regions 16a to 16d held by the support body regions 19e and extended in a direction perpendicular to the optical axis AX. The rotary drive apparatus 364 rotates the rotary body 19a via the shaft portion 19d. The rotary drive apparatus 364 is fixed onto a support member 19j having a pedestal and a strut.

When the shaft portion 19d is rotated by the rotary drive apparatus 364, the support 19f is also rotated about the rotation axis RX. Consequently, the four diffusion regions 16a to 16d are sequentially moved onto the optical axis AX, and the diffusion regions 16a to 16d move across the optical axis AX. In this case, the arrangement relationship is adjusted such that the centers of the diffusion regions 16a to 16d are positioned to cross the optical axis AX. When the shaft portion 19d is rotated, for example, in a clockwise direction when viewed from the front side, the diffusion regions 16a to 16d are arranged on the optical axis AX in this order. The image is intermittently displayed on the display element 11 at timing when the diffusion regions 16a to 16d are arranged on the optical axis AX.

Fourth Embodiment

A head-up display apparatus according to a fourth embodiment is described below. Note that the head-up display apparatus of the fourth embodiment is a modification of the head-up display apparatus of the first embodiment or the second embodiment, and matters not particularly described are similar to those of the first embodiment or the like.

Figure 13:
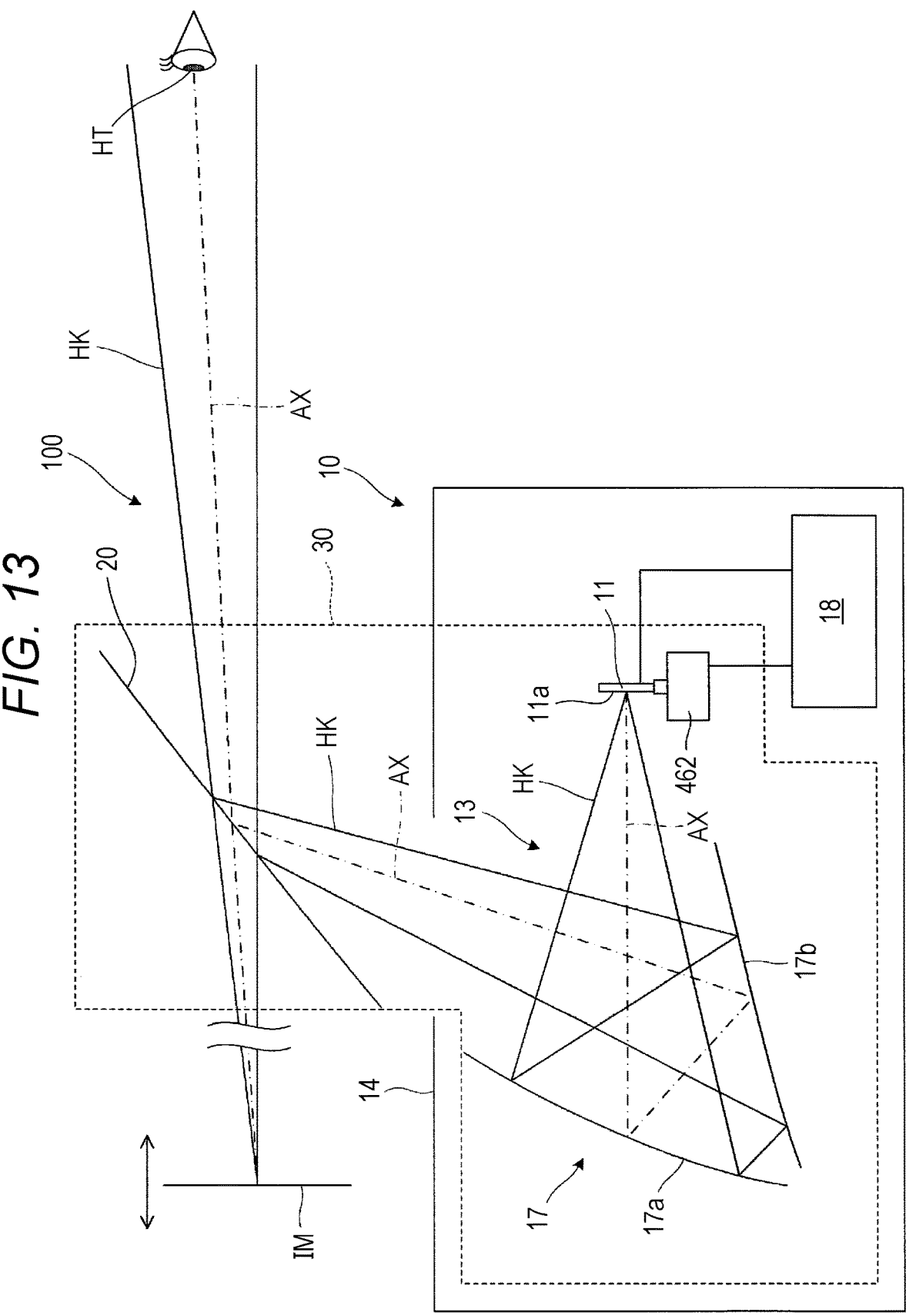
FIG. 13 is a view for explaining a head-up display apparatus of a fourth embodiment.

As illustrated in FIG. 13, the main body optical system 13 directly converts an image formed on the display element 11 into a virtual image by means of the virtual image formation optical system 17.

The main control apparatus 90 and the display control portion 18, which are control portions, periodically move the position of the display element 11 back and forth in the optical axis AX direction via the arrangement change apparatus (projection distance change part) 462 to periodically change the projection distance such that the image formed on the display element 11 corresponds to the projection distance.

Fifth Embodiment

A head-up display apparatus according to a fifth embodiment is described below. Note that the head-up display apparatus of the fifth embodiment is a modification of the head-up display apparatus or the like of the first embodiment, and matters not particularly described are similar to those of the first embodiment or the like.

Figure 14:
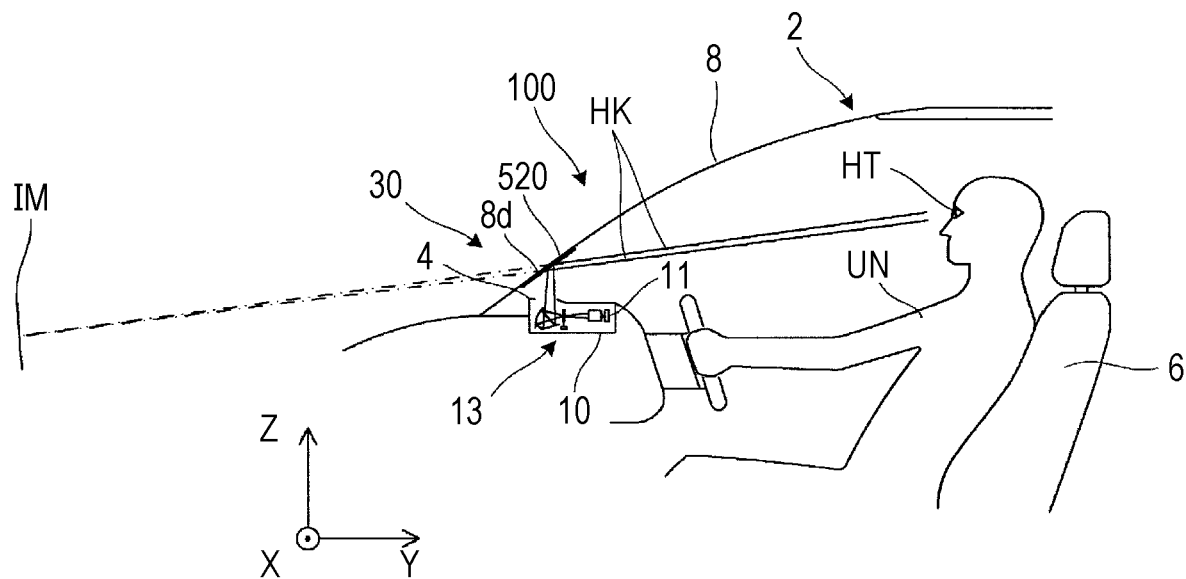
FIG. 14 is a view for explaining a head-up display apparatus of a fifth embodiment.

As illustrated in FIG. 14, in the case of the head-up display apparatus according to the fifth embodiment, a display screen 520, which is a screen, is attached to an inner side of a reflection region 8d having a rectangular shape of the windshield 8 provided on the front side of the driving seat.

[Other]

Heretofore, the head-up display apparatus 200 has been described as specific embodiments, but the head-up display apparatus according to the present invention is not limited to the above. For example, in the first embodiment, the arrangement of the image display apparatus 100 can be inverted upside down such that the display screen 20 is arranged at an upper portion or a sun visor position of the windshield 8, and in this case, the display screen 20 is arranged obliquely below on the front side of the drawing unit 10. Furthermore, the display screen 20 may be arranged at a position corresponding to a conventional mirror of an automobile.

In the aforementioned embodiments, the profile of the display screen 20 is not limited to rectangular, but may be various shapes.

The image formation optical system 15 and the virtual image formation optical system 17 illustrated in FIG. 2 are mere examples, and the optical configurations of the image formation optical system 15 and the virtual image formation optical system 17 may be changed properly.

Figure 15A:
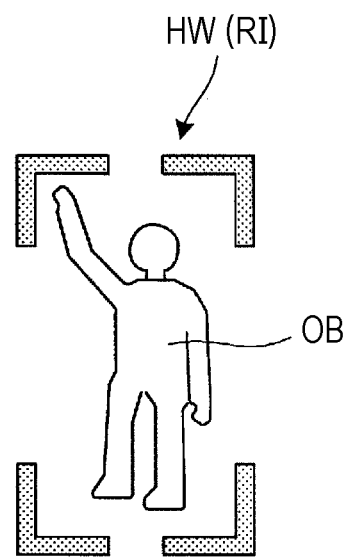
FIGS. 15A and 15B are views for explaining a framework and an index of a variation.
Figure 15B:
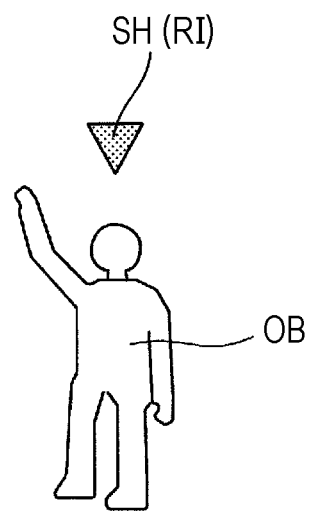

As illustrated in FIG. 15A, the framework HW, which is a related-information image RI, is not limited to those surrounding the entire object OB, but may be formed of a plurality of portions. Furthermore, as illustrated in FIG. 15B, the related-information image RI may be an index SH displayed adjacent to the object OB.

Furthermore, the movable lens 15f can be replaced with a variable-focus lens enclosing a liquid or the like.

Above, the environment monitor portion 72 detects the object OB present in front of the vehicle body 2, and the image display apparatus 100 displays the related-information image, e.g., the frameworks HW1, HW2 and HW3 corresponding to the arrangement of the object OB, but, regardless of the presence or absence of the object OB, a communication network may be used to acquire associated drive-related information, and such drive-related information can be displayed on the image display apparatus 100. For example, display for warning of a car present in blind spot, an obstacle, or the like is possible.

The invention claimed is:

1. A head-up display apparatus comprising:
a projection optical system that projects a virtual image of an image generated by an image generation device;
an object detection part that detects an object present in a detection region and detects a distance from the projection optical system to the object as a target distance;
a projection distance change part that periodically changes a projection distance of the virtual image by the projection optical system; and
an image addition part that adds a related-information image as a virtual image by the projection optical system to the detected object at timing when the target distance substantially matches the projection distance,
wherein the projection optical system has a diffusion screen, a first optical system that generates an intermediate image of the image, and a second optical system that converts the intermediate image into a virtual image, and
wherein the projection distance change part periodically moves in an optical axis direction any one of at least a part of the first optical system and the diffusion screen on which the intermediate image is formed, and periodically changes a projection distance of the virtual image.

2. The head-up display apparatus according to claim 1, wherein the projection distance change part changes the projection distance of the virtual image by moving the diffusion screen in an optical axis direction, and a movement range of the diffusion screen is set within the depth of focus of the first image optical system.

3. The head-up display apparatus according to claim 1, wherein the projection distance change part continuously changes the projection distance.

4. The head-up display apparatus according to claim 1, wherein the projection distance change part changes the projection distance in stages.

5. The head-up display apparatus according to claim 1, wherein the object detection part detects a movable body and a human as the object.

6. The head-up display apparatus according to claim 5, wherein the object detection part includes a three-dimensional measurement instrument.

7. The head-up display apparatus according to claim 1, wherein the related-information image is a framework surrounding the object or an index adjacent to the object.

8. The head-up display apparatus according to claim 1, wherein the projection distance change part continuously changes the projection distance.

9. The head-up display apparatus according to claim 1, wherein the projection distance change part changes the projection distance in stages.

10. The head-up display apparatus according to claim 1, wherein the object detection part detects a movable body and a human as the object.

11. The head-up display apparatus according to claim 1, wherein the related-information image is a framework surrounding the object or an index adjacent to the object.

12. The head-up display apparatus according to claim 2, wherein the projection distance change part continuously changes the projection distance.

13. The head-up display apparatus according to claim 2, wherein the projection distance change part changes the projection distance in stages.

14. The head-up display apparatus according to claim 2, wherein the object detection part detects a movable body and a human as the object.

15. The head-up display apparatus according to claim 2, wherein the related-information image is a framework surrounding the object or an index adjacent to the object.

16. The head-up display apparatus according to claim 3, wherein the object detection part detects a movable body and a human as the object.

17. The head-up display apparatus according to claim 3, wherein the related-information image is a framework surrounding the object or an index adjacent to the object.

18. The head-up display apparatus according to claim 4, wherein the object detection part detects a movable body and a human as the object.

19. The head-up display apparatus according to claim 4, wherein the related-information image is a framework surrounding the object or an index adjacent to the object.

20. A head-up display apparatus comprising:
   a projection optical system that projects a virtual image of an image generated by an image generation device;
   an object detection part that detects an object present in a detection region and detects a distance from the projection optical system to the object as a target distance;
   a projection distance change part that periodically changes a projection distance of the virtual image by the projection optical system; and
   an image addition part that adds a related-information image as a virtual image by the projection optical system to the detected object at timing when the target distance substantially matches the projection distance,
   wherein the projection optical system has a first optical system that generates an intermediate image of the image, and a second optical system that converts the intermediate image into a virtual image, and
   wherein the projection distance change part periodically moves in an optical axis direction only at least a part of the first optical system, and periodically changes a projection distance of the virtual image.

* * * * *